Aug. 22, 1939.   C. F. GREEN   2,170,607
DOLLY FOR DISMOUNTING VEHICLE WHEELS
Filed Aug. 11, 1938   3 Sheets-Sheet 1
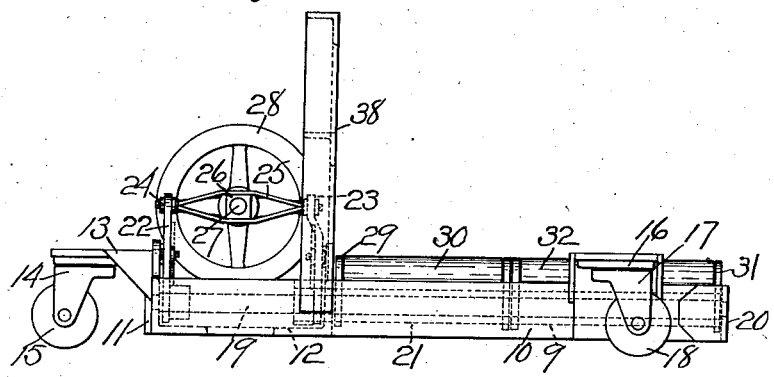
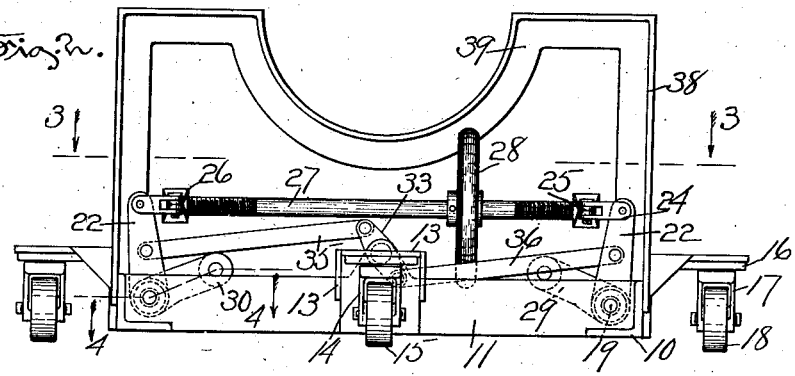
INVENTOR
Clifton F. Green
by
Arthur B. Jenkins,
ATTORNEY Aug. 22, 1939.   C. F. GREEN   2,170,607
DOLLY FOR DISMOUNTING VEHICLE WHEELS
Filed Aug. 11, 1938   3 Sheets-Sheet 2
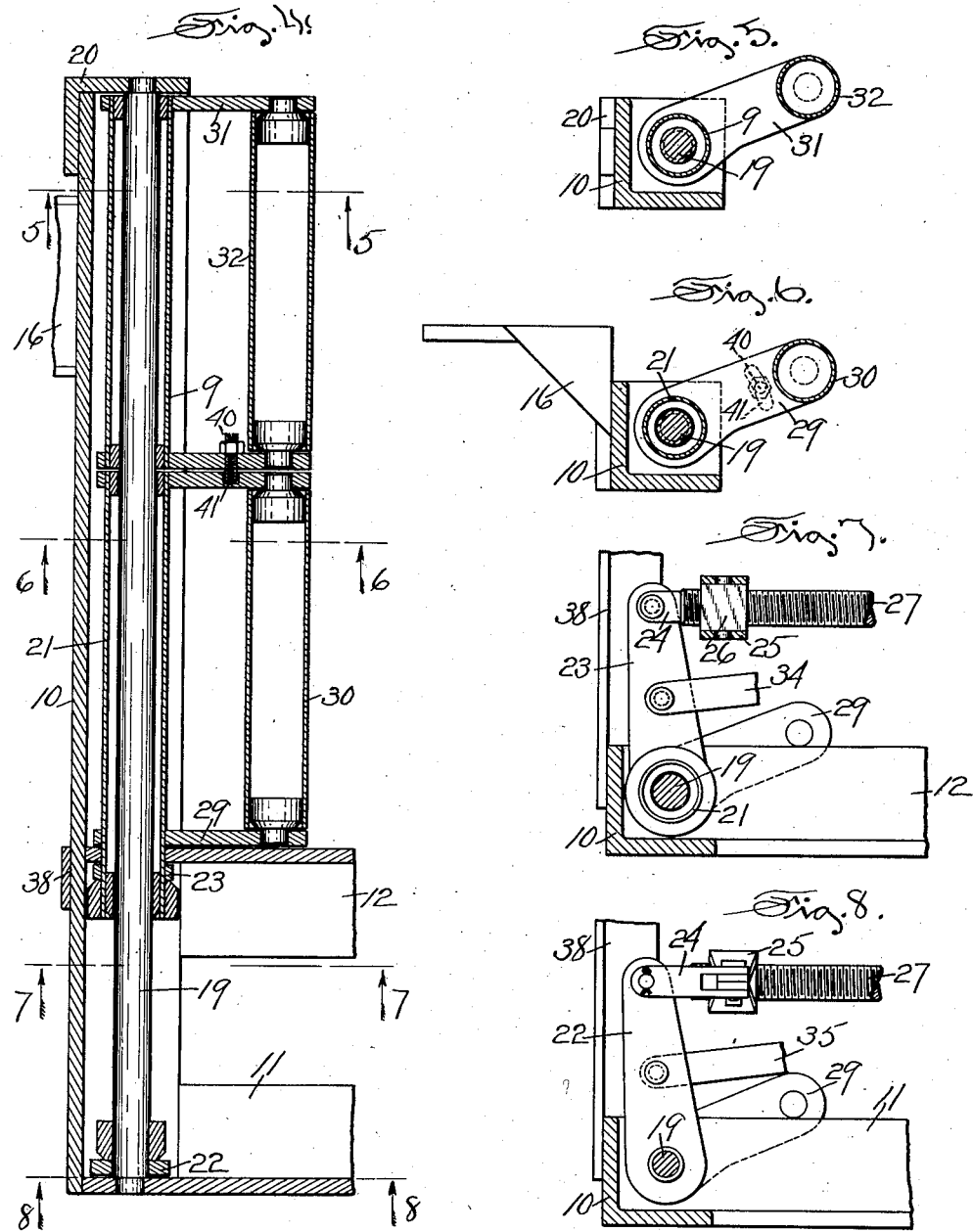
INVENTOR
Clifton F. Green,
by
Arthur B. Jenkins
ATTORNEY Aug. 22, 1939.  C. F. GREEN  2,170,607
DOLLY FOR DISMOUNTING VEHICLE WHEELS
Filed Aug. 11, 1938  3 Sheets-Sheet 3

INVENTOR
Clifton F. Green
by
Arthur B. Jenkins
ATTORNEY

Patented Aug. 22, 1939

2,170,607

UNITED STATES PATENT OFFICE 2,170,607

DOLLY FOR DISMOUNTING VEHICLE WHEELS

Clifton F. Green, New Haven, Conn., assignor of one-third to Alden H. Williams, Milford, Conn., and one-third to George E. Wood, East Haven, Conn.

Application August 11, 1938, Serial No. 224,234

12 Claims. (Cl. 254—2)

My invention relates to the class of devices employed in connection with the removal of wheels from service vehicles such as trucks, busses, etc., and an object of my invention, among others, is to produce a device for such purpose that shall be simple and durable in construction and that may be readily operated to engage and support wheels and to remove them after they have been loosened from their journals.

One form of a dolly embodying my invention and in the construction and use of which the objects herein set out, as well as others, may be attained is illustrated in the accompanying drawings in which—

Figure 1 is a view in side elevation of my improved dolly.

Figure 2 is an end view of the same.

Figure 3 is a view in horizontal section on a plane denoted by the dotted line 3—3 of Figure 2.

Figure 4 is a view on enlarged scale in horizontal section through one of the side members of my improved dolly.

Figure 5 is a view in section on a plane denoted by the dotted line 5—5 of Fig. 4.

Figure 6 is a view in section on a plane denoted by the dotted line 6—6 of Fig. 4.

Figure 7 is a view in section on a plane denoted by the dotted line 7—7 of Fig. 4.

Figure 8 is a view in section on a plane denoted by the dotted line 8—8 of Fig. 4.

Figure 9:
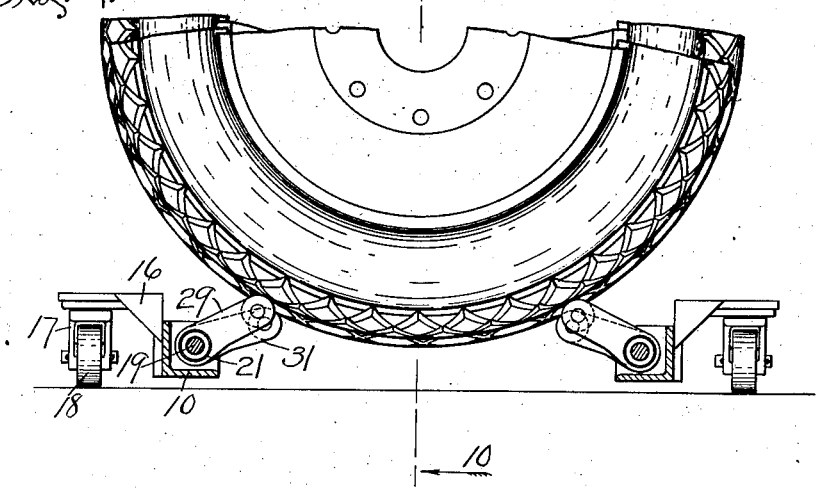
Figure 9 is a view on enlarged scale in vertical cross section on a plane denoted by the dotted line 9—9 of Fig. 3 illustrating the operation of the dolly in supporting a wheel.

The wheels in use at the present time upon heavy vehicles, as busses, trucks, etc., are extremely cumbersome and heavy, requiring much effort and inconvenience in effecting removal from their journals which is frequently required for replacing tires, effecting repairs, etc., and I have therefore devised means for accomplishing such removal in a ready and expeditious manner and with comparatively little effort, such device being shown in the accompanying drawings and which consists of a base frame comprising side parts for supporting the wheels and a front portion containing the operating mechanism, the whole being supported upon rollers in the form of casters. The frame is preferably made up of angle iron, the side members each comprising a bar 10 of L-shape in cross section joined in any suitable manner, as by welding, to a front cross bar 11 which forms the front of the dolly. A rear cross bar 12 spaced a proper distance rearwardly from the cross bar 11 is secured at its opposite ends to the side bars 10, these cross bars also being of L-shape in cross section and the ends being suitably formed and butted together to comprise the base portion of the frame.

A bracket 13 is secured to the front cross bar 11 about midway of its length, this bracket having a forked support 14 for a roller 15. Similar brackets 16 are secured to the side bars 10 near their rear ends and have similar supports 17 and rollers 18 mounted therein.

An elevating shaft 19 appurtenant to each of the side members of the frame is mounted at its front end for rotating movement in the upstanding flange from the cross bar 11 and at its rear end in an angle plate 20 secured to the rear end of the side bar, and an elevating sleeve 21 surrounds said shaft and is mounted for rotating movement independently thereof at its front end in the vertical flange of the cross bar 12 and at its rear end on the shaft 19 as shown in Fig. 4. Actuating arms 22 and 23 are secured in any suitable manner at their lower ends to each of said shafts and sleeves, respectively, the upper ends of said arms being joined by links 24 with the opposite ends of evener bars 25 pivotally mounted at their centers on blocks 26, said blocks being screw threadedly engaged by opposite ends of an actuating shaft 27. The threads at the opposite ends of the actuating shaft are different, one being a right-hand thread and another a left-hand thread so that when operated as by means of an actuating wheel 28 secured to the shaft the blocks and eveners will be moved in opposite directions.

Wheel supporting arms 29 are secured to opposite ends of each of the sleeves 21, the outer ends of said arms supporting rests 30 for the wheels to be removed from vehicles. Similar wheel supporting arms 31 are secured to opposite ends of housing sleeves 9 rigidly connected with the shafts 19 between the outer ends of the sleeves 21 and the outer ends of the side parts of the frame, and each pair of arms 31 supports a rest 32 in line with a rest 30, and as shown in Fig. 3 of the drawings. The arms 29 and 31 are mounted on the shaft 19 by means of spacers within the sleeves, the spacers within the sleeves 21 being rotatable on the shaft 19 as shown in Fig. 4 of the drawings.

In order that the shafts 19 and lifting sleeves on opposite sides of the machine may have equal simultaneous movement, equalizer levers 33 are pivotally mounted on the upstanding parts of the front and rear cross bars 11 and 12, substantially midway of their ends, and an equalizer bar 34 on one side of the machine is pivotally connected at its opposite ends with the actuating arm 23 and one end of the lever 33 mounted on the rear cross bar 12, and another equalizer bar 37 is pivotally connected with the opposite end of said equalizer lever and with the actuating arm 23 on this side of the frame, as shown in Fig. 3 of the drawings. Similarly an equalizer bar 36 is pivotally attached at its opposite ends to the actuating arm 22 on one side at the front of the machine and to one end of the other of said equalizer levers mounted on the front cross bar 11, and another equalizer bar 35 is pivotally attached at its opposite ends to the equalizer lever 33 at the front of the front part of the frame and to the actuating arm 22 on the opposite side of the machine, said arms 22 being those secured to the lifting shaft 19.

From this explanation it will be seen that the oppositely disposed rests 30 will have the same amount of movement simultaneously imparted thereto and the same results will be attained as to the rests 32. Should a rest on one side of the frame make contact with the wheel before the rest opposite thereto on the other side of the frame, the latter will automatically shift laterally, owing to its being mounted on casters, to bring the rests into even contact, this shifting action being produced by the cam action of the rests against the wheels as they engage each other. In the event that one of the rests 30 or 32 on one side of the frame should make contact with a tire or wheel rim before the other of said rests the movement of the rest first making contact will be halted until the evener 25 on that side of the frame causes the other of said rests to make contact with the tire, after which both of said rests will move together and similarly support the wheel on this side of the frame.

A wheel supporting frame is secured to and rises from the base or frame at its forward end, this wheel supporting frame comprising side posts 38 secured at their lower ends to the rear cross bar 12, and a top member 39 extends and is secured at its opposite ends to the upper ends of the posts 38, this top member having a semicircularly formed notch located opposite to the central portions of the wheels standing upon the rests 30 and 32 and leaning against said wheel and supporting frame. This notch enables unobstructed access to the hub cap, wheel nuts, cones, bearings, etc. for removal or replacement of parts while the wheel is supported on the frame. This ready access to the center of the wheel may be appreciated from the fact that the equalizing action of the equalizing mechanism on the supports or rests 30 and 32 enables the position of the wheel to be adjusted in all directions, vertically through the action of the rests and laterally by the action of the caster supports and a wheel may be tilted from a vertical position forward or backward by action of the equalizing mechanism. This enables the hole in the wheel assembly to be readily adjusted with its axis parallel with the axle shaft or axle tube, as the case may be.

Figure 10:
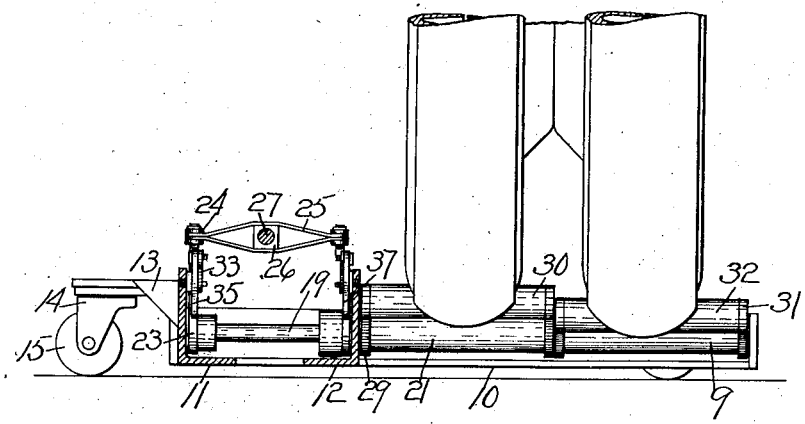
Figure 10 is a similar view but in lengthwise section through the device on a plane denoted by the dotted line 10—10 of Fig. 9.

The operation of the lifting devices to evenly support the wheels is illustrated in Figs. 9 and 10 in which it will be seen that the wheel supports having been evenly raised the supports nearest the back of the rest engage the wheel farthest from the observer looking backwardly, and continued operation of the hand wheel 28 has brought the wheel supports nearest the front of the machine into contact with the front wheel, and all of the supports by continued operation of the hand wheel 28 will now simultaneously act to support and raise the two wheels. When the rests 32 first engage the wheels the eveners 25 cause the rests 30 to rise independently of the rests 32 until all of the rests come into contact.

Further than this it will be noted that the equalizing mechanism hereinbefore described will enable the rests 30 and 32 to move together equally or unequally. One may remain stationary while the other moves up or down, or one may move up while the other moves down. To control this movement so that the wheel assembly cannot be tilted to such an angle that it will fall from the wheel supporting frame 38, a stop 40 in the form of a screw projects through one of the arms 31 into a groove 41 in one of the arms 29 as shown in Figs. 4 and 6 of the drawings, the groove having end walls to receive the stop and thereby limit the movement of the rests.

It will be noted that the rests 30 and 32, as particularly shown in Fig. 4, are rotatable on their supports thereby permitting a wheel assembly to be readily adjusted by movement or rolling action of said rests on said supports.

Due to the construction hereinbefore described the dolly is not only useful in the operation of removing and installing wheel assemblies, but by reason of the fact that the space underneath the wheel assembly is practically clear, the dolly may be readily used as a truck to move wheel assemblies from one place to another, as such assemblies may be readily picked up from the floor and transported from place to place.

I claim:

1. A dolly comprising a frame including side members spaced apart for support of a load between them, rests oppositely disposed on said side members to receive said load, means for operating said rests to raise and lower them, and an operative connection between said rests and operating means, said connection including an equalizer to effect simultaneous equal movement of said rests.

2. A dolly comprising a frame including side members spaced apart for support of a load between them, rests arranged in line on one of said side members, means for operating said rests to raise and lower them, an equalizer mechanism between said operating means and rests to effect simultaneous contact of said rests with different parts of said load, and means for supporting the load on the opposite side of the frame from said rests.

3. A dolly comprising a frame including side members spaced apart for support of a load between them and a front member connecting said side members, rests oppositely disposed on said side members to receive said load, elevating members rotatably mounted on said side members and operatively connected with said rests, an actuating shaft with means for operating it rotatably mounted on said front member, an equalizer mechanism connecting said elevating members to effect simultaneous equal movement thereof, and an operative connection between said actuating shaft and said elevating members and including said equalizer mechanism.

4. A dolly comprising a frame including side members spaced apart for support of a load between them and a front member connecting said side members, rests oppositely disposed on said side members to receive said load, elevating members rotatably mounted on said side members and operatively connected with said rests, actuating arms secured to and projecting from said elevating members, an actuating shaft rotatably mounted on said front member and operatively connected with said elevating members, an equalizer lever pivotally mounted on said front member, and equalizer bars connecting opposite ends of said equalizer lever with said arms to effect simultaneous equal movement of said elevating members.

5. A dolly comprising a frame including side members spaced apart for support of a load between them and a front member connecting said side members, rests oppositely disposed on said side members to receive said load, elevating members rotatably mounted on said side members and operatively connected with said rests, an actuating shaft rotatably mounted on said front member and having right and left-hand threads on its opposite ends, blocks having threaded openings engaged with said threaded ends of said actuating shaft, and a connection between said elevating members and said blocks for operation of the former by the latter.

6. A dolly comprising a frame including side members spaced apart for support of a load between them and a front member connecting said side members, a plurality of rests supported side by side by one of said side members to receive said load, an elevating shaft mounted on said side member and operatively connected with one of said rests, an elevating sleeve mounted on said shaft and operatively connected with the other of said rests, an actuating shaft rotatably mounted on said front member, and an operative connection between said actuating shaft and said sleeve and said elevating shaft for simultaneous operation of said elevating shaft and sleeve.

7. A dolly comprising a frame including side members spaced apart for support of a load between them and a front member connecting said side members, a pair of rests supported side by side by one of said side members to receive said load, an elevating shaft mounted on said side member and operatively connected with one of said rests, an elevating sleeve mounted on said side member and operatively connected with the other of said rests, an actuating shaft rotatably mounted on said front member, and an operative connection between said actuating shaft and said sleeve and said elevating shaft for simultaneous operation of said sleeve and said elevating shaft.

8. A dolly comprising a frame including side members spaced apart for support of a load between them and a front member connecting said side members, a pair of rests supported side by side on one of said side members to receive said load, an elevating shaft operatively connected with one of said rests, an elevating sleeve mounted on said elevating shaft and operatively connected with the other of said rests, an actuating shaft mounted on said front member, an evener bar operatively connected with said actuating shaft, and an operative connection between opposite ends of said evener bar and said sleeve and said elevating shaft for operation of said sleeve and elevating shaft.

9. A dolly comprising a frame including side members spaced apart for support of a load between them and a front member connecting said side members, a pair of rests mounted side by side on said side members, an elevating shaft mounted on said side members and operatively connected with one of said rests, an elevating sleeve mounted on said shaft and operatively connected with the other of said rests, an actuating shaft mounted on said front member and having a threaded end, a block mounted on said threaded end, an evener bar pivotally mounted on said block, and an operative connection between opposite ends of said bar and said elevating shaft and sleeve for operation of said sleeve and elevating shaft.

10. A dolly comprising a frame including side members spaced apart to support a load between them and a front member connecting said side members, two rests mounted side by side on each of said side members to receive said load, an elevating shaft in each side member operatively connected with one of said rests, an elevating sleeve mounted on each elevating shaft and operatively connected with another of said rests, an actuating shaft mounted on said front member and having differently threaded ends, blocks mounted on said threaded ends, evener bars pivotally mounted on each of said blocks, and an operative connection between the opposite ends of each of said evener bars and the elevating shaft and elevating sleeve on one of said side members.

11. A dolly comprising a frame including side members spaced apart to support a load between them and a front member connecting said side members, two rests supported side by side on each of said side members, an elevating shaft supported on each of said side members and operatively connected with one of said rests, an elevating sleeve mounted on each of said shafts and operatively connected with one of said rests, an actuating arm projecting from each of said elevating shafts, an actuating arm projecting from each of said elevating sleeves, a pivotally mounted evener bar connected at its opposite ends with the actuating arms projecting from the sleeve and shaft on each side member of the frame, an actuating shaft operatively connected with said evener bars to simultaneously move them in opposite directions, and an equalizing mechanism connecting the actuating arms of the shaft and sleeve on each of the side members of the frame.

12. A dolly comprising a frame including side members spaced apart for support of a load between them and a front member connecting said side members, a pair of rests supported side-by-side on one of said side members to receive said load, an elevating shaft operatively connected with one of said rests, an elevating sleeve mounted on said elevating shaft for operative connection with the other of said rests, an actuating shaft mounted on said front member, and an operative connection between said actuating shaft and said sleeve and said elevating shaft for simultaneous operation of said sleeve and elevating shaft.

CLIFTON F. GREEN.